US012734104B2

(12) United States Patent
Leth

(10) Patent No.: US 12,734,104 B2
(45) Date of Patent: Sep. 15, 2026

(54) VIBRATOR FOR STIMULATION OF CLITORIS

(71) Applicant: SFV ApS, København Ø (DK)

(72) Inventor: Frederikke Emilie Leth, København S (DK)

(73) Assignee: SFV ApS, København Ø (DK)

( * ) Notice: Subject to any disclaimer, the term of this patent is extended or adjusted under 35 U.S.C. 154(b) by 718 days.

(21) Appl. No.: 18/033,893

(22) PCT Filed: Nov. 4, 2021

(86) PCT No.: PCT/DK2021/050325
§ 371 (c)(1),
(2) Date: Apr. 26, 2023

(87) PCT Pub. No.: WO2022/105972
PCT Pub. Date: May 27, 2022

(65) Prior Publication Data

US 2024/0009073 A1 Jan. 11, 2024

(30) Foreign Application Priority Data

Nov. 18, 2020 (DK) ........................... PA 2020 01298

(51) Int. Cl.
*A61H 19/00* (2006.01)
*A61H 23/02* (2006.01)

(52) U.S. Cl.
CPC ......... *A61H 19/34* (2013.01); *A61H 23/0263* (2013.01); *A61H 2201/163* (2013.01); *A61H 2201/1645* (2013.01); *A61H 2201/165* (2013.01)

(58) Field of Classification Search
CPC ...................................................... A61H 19/34
See application file for complete search history.

(56) References Cited

U.S. PATENT DOCUMENTS

| | | | | |
|---|---|---|---|---|
| 6,949,067 | B1 * | 9/2005 | Dann | A61H 19/34 600/38 |
| 11,007,110 | B1 * | 5/2021 | Zhou | A61H 23/0263 |
| 2005/0124853 | A1 * | 6/2005 | Norma | A61H 19/50 600/38 |
| 2014/0088470 | A1 | 3/2014 | Topolovac et al. | |
| 2015/0320636 | A1 * | 11/2015 | Fine | A61H 19/44 600/38 |
| 2018/0092799 | A1 * | 4/2018 | Lenke | A61H 9/0007 |
| 2018/0125748 | A1 * | 5/2018 | Goldenberg | A61H 23/0263 |
| 2020/0085676 | A1 | 3/2020 | Haddock et al. | |
| 2021/0244607 | A1 * | 8/2021 | Asefvaziri | A61H 15/0078 |

FOREIGN PATENT DOCUMENTS

| | | | |
|---|---|---|---|
| EP | 3142622 | A1 | 3/2017 |
| WO | 2016162580 | A1 | 10/2016 |

* cited by examiner

*Primary Examiner* — Thaddeus B Cox
(74) *Attorney, Agent, or Firm* — Elmore Patent Law Group, P.C.; Joseph C. Zucchero; Carolyn S. Elmore

(57) ABSTRACT

A hands-free vibrator for stimulating the clitoris is disclosed. The device comprises at least one vibration motor; a vibrator body with associated electronic setup, power supply and controller. The vibrating body comprises a hole and the body is designed as an oval, for positioning and holding of the vibrator.

19 Claims, 3 Drawing Sheets

VIBRATOR FOR STIMULATION OF CLITORIS

FIELD OF THE INVENTION

The present invention relates to a hands-free vibrator for stimulating the clitoris.

BACKGROUND OF THE INVENTION

Various types of devices are known for the purpose of stimulating the clitoris of a human female.

One such device is known from EP 3 142 622 A1. This document discloses a concave round shape with grabbing arms on the sides, which are clamped between the outer labia (labia majora) and the clitoris. In this way, the vibrator is held by the outer labia, while the concave shape sends the vibrations directly to the clitoris.

Another known device is known from U.S. Pat. No. 6,733,438. This document discloses a round vibrator with a recess in it, which is used to create a vacuum, which thereby holds the vibrator on the clitoris.

Yet another device is known from WO 96/11660. This document discloses a round ring with open ends fixed around the clitoris during intercourse. However, this invention is not a vibrator, but instead a flexible ring of a soft material.

Still another device is known from WO 2018/050933. This document discloses a vibrator to be attached around the clitoris with two clips. However, the invention is used with a handle, and thus cannot be used without hands.

It is seen that known hands-free techniques use either capture arms or vacuum to attach the vibrator around the clitoris.

Such direct contact with the clitoris may for some women be felt uncomfortable or even painful.

Accordingly, a need persists for a vibrator which overcomes the disadvantage of the prior art. It is an objective of the present invention to provide a vibrator for stimulation of the clitoris which overcomes the disadvantage of the prior art.

BRIEF DESCRIPTION OF THE INVENTION

This objective is fulfilled with the present invention, which relates to a hands-free vibrator for stimulating the clitoris, comprising:

- at least one vibration motor;
- a vibrator body with associated electronic setup, power supply and controller, wherein the vibrating body contains a hole and the body is designed as an oval, for positioning and holding of the vibrator.

Accordingly, the present invention provides an oval vibrator body which contains the vibration mechanism, and which comprises a hole in the oval body in the middle thereof, and which during use is attached around the inner labia (labia minora), which thereby holds the vibrator in place.

The invention is characterized in that the oval vibrator body does not touch the clitoris directly, as in the devices of the prior art.

By touching only the inner labia and not the clitoris directly, the invention can distribute the vibrations evenly via the nerve endings around the clitoris, causing the clitoris to be exposed only to indirect vibrations.

Indirect vibrations on the clitoris reduce discomfort and any pain that would otherwise occur by applying direct vibrations to the clitoris.

Hence, the invention is a new type of hands-free vibrator, and it may be adapted to fit the anatomy of all types of women.

The feature of allowing hands-free operation presents various advantages. First, disabled or physically impaired or other motorically challenged women may find it difficult to reach down and hold a vibrator in place in the region of the genitals. Secondly, during prolonged holding by hands of a vibrator, the induced vibrations may be felt unpleasant to the hands of the user.

DETAILED DESCRIPTION OF THE INVENTION

Figure 1:
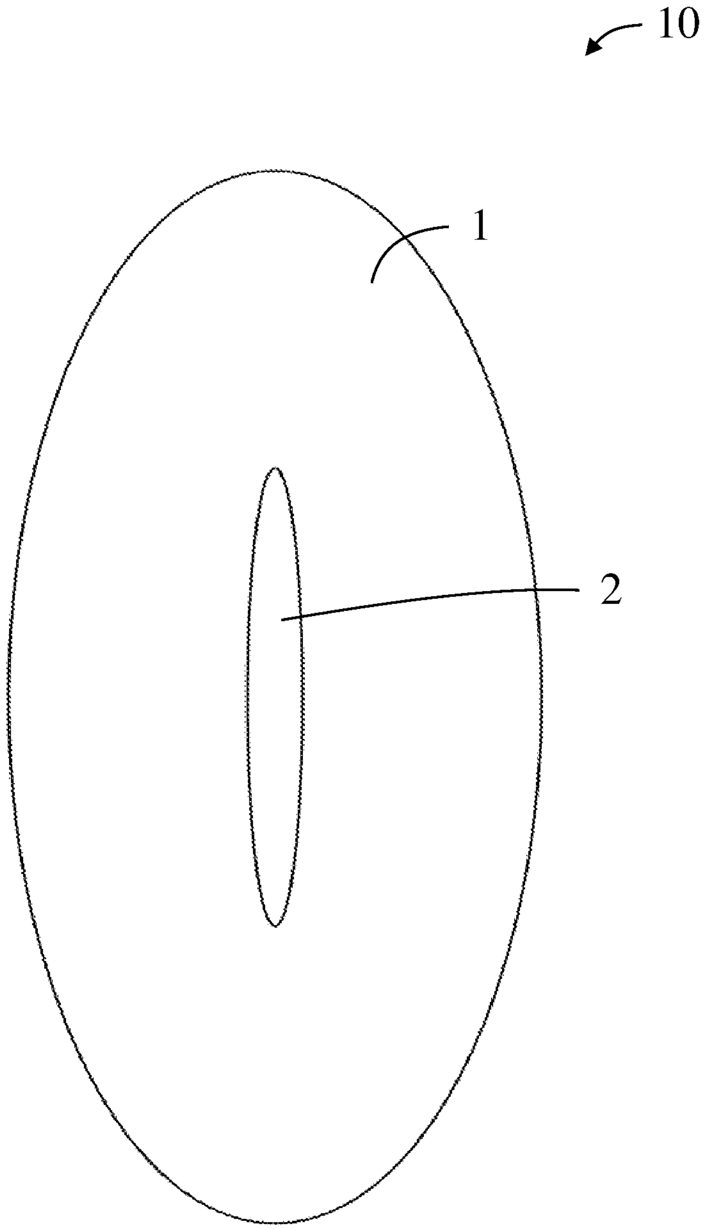
FIG. 1 is a diagrammatic illustration, illustrating the design of the vibrator body, where the vibrator body comprises a through-going hole, which is to be arranged around the inner labia and thereby is held in place both in use and not in use, i.e. irrespective whether the vibrator is vibrating or not.

The present invention relates to a hands-free vibrator for stimulating the clitoris, comprising:

- at least one vibration motor;
- a vibrator body with associated electronic setup, power supply and controller wherein the vibrating body comprises a hole and the body is designed as an oval, for positioning and holding of the vibrator.

In an embodiment of the invention, the vibrator body in its interior independently is housing one or more of the at least one vibration motor, the associated electronic setup, the power supply and/or the controller.

In an embodiment of the invention, the vibrator body independently is having a largest outer dimension in a longitudinal direction of 4-9 cm, such as 5-8 cm, for example 6-7 cm; and/or the vibrator body is having a largest outer dimension in a first transversal direction being perpendicular to the longitudinal direction of 1.5-4 cm, such as 2.0-3.5 cm or 2.5-3.0 cm; and/or the vibrator body is having a largest outer dimension in a second transversal direction being perpendicular to both the longitudinal direction and the first transversal direction of 0.5-2.25 cm, such as 0.75-2.00 cm, such as 1.00-1.75 cm or 1.25-1.50 cm.

In an embodiment of the invention, the hole of the vibrator body is a though-going hole in said body. In other embodiments the hole may be designed as a not-through-going recess at one or two opposite sides of the body of the vibrator.

In an embodiment of the invention, the hole of the vibrator body is having an oblong shape.

In an embodiment of the invention, the orientation of the oblongly shaped hole is aligned with the longitudinal direction of said body.

In an embodiment of the invention, the hole in the vibrator body is having a largest extension in a longitudinal direction of 3.0-8.5 cm, such as 3.50-8.00 cm, e.g. 4.00-7.50 cm, such as 4.50-7.00 cm, such as 5.00-6.50 cm or 5.50-6.00 cm.

In an embodiment of the invention, the hole in the vibrator body is having a largest extension in a direction perpendicular to its longitudinal direction of 0.1-3.50 cm, such as 0.5-3.00 cm, for example 1.00-2.50 cm or 1.50-2.00 cm.

In an embodiment of the invention, the at least one vibration motor is an electrically driven motor.

In an embodiment of the invention, the controller is being electrically connected to the power supply and to the at least one vibration motor; and said controller is being configured for controlling the operation of said vibration motor.

In an embodiment of the invention, the power supply is a battery, such as a rechargeable battery.

In an embodiment of the invention, the body on its outer surface comprises a first electric connection, such as an electric socket for receiving an electric plug, wherein said first electric connection is electrically connected to said battery, thereby enabling charging of said battery.

In an embodiment of the invention, the controller is being configured to switch on/off the at least one vibration motor; and optionally the controller is being configured to control the speed of the at least one vibration motor, and optionally, the controller is being configured to control a speed pattern as a function of time of said at least one vibration motor.

In an embodiment of the invention, the at least one vibration motor comprises an axle which is configured to rotate upon being supplied with power thereto, wherein said axle is defining a rotational axis, wherein a weigh element is being attached to said axle in such a way that the center-of-mass of said weight element is arranged offset to said rotational axis of said axle, thereby providing vibrations upon rotating thereof.

In an embodiment of the invention, the vibrator, such as the vibrator body, comprises wings or grabbing arms that support the fixation around the inner labia.

In an embodiment of the invention, the vibrator comprises a receiver for electromagnetic radiation, such as a receiver complying with a Bluetooth protocol, wherein said receiver is being electronically connected to said controller, thereby enabling remote and/or wireless control of said vibrator.

In an embodiment of the invention, the vibrator body is being manufactured from a flexible material having a Shore 00 hardness of 0.1-85, such as 1-80, for example 5-70, such as 10-60, such as 20-50 or 30-40.

In an embodiment of the invention, the vibrator body is being manufactured from a flexible material, such as silicone or rubber.

In an embodiment of the invention, the hands-free vibrator comprises one or more control knobs being electrically connected to said controller, wherein one or more of said control knobs is/are arranged at a position on the outer surface of said vibrator body.

The vibrator of the invention is for producing stimulation of a user's clitoris, and it can be used without supporting hands, as the vibrator is held in place by the inner labia (labia minora). The method of using the vibrator is designed to be self-supporting and the vibrator therefore does not require the use of hands from the user. The device of the invention comprises of an oval-shaped body comprising the vibration mechanism and the hole in the center of the oval vibrator body is during use intended to surround the inner labia (labia minora). Accordingly, the oval vibrator body is configured to surround the inner labia during use and stimulate the clitoris indirectly via the inner labia. It is the hole in the oval vibrator body that enables the vibrator to be attached around the inner labia, which means that it can be used without hands.

As the oval vibrator body is attached around the inner labia (labia minora), so that the vibrations of the oval body are evenly distributed around the clitoris via the inner labia during use, an indirectly and more subtle distribution of vibrations around the clitoris is obtained, while direct vibrations on the clitoris are avoided.

Referring now to the drawings for better illustrating the present invention, FIG. 1 is a diagrammatic illustration of the device of the present invention. The device 10 is a vibrator for stimulating the clitoris. The vibrato comprises a vibrator body 1 with associated electronic setup, power supply and controller arranged within that body. The vibrator body is oblongly or oval shaped. The vibrator body comprises an oblong hole 2.

The oblong hole is during use intended to be arranged around the labia minora of a human female. This is illustrated in FIG. 2.

Figure 2:
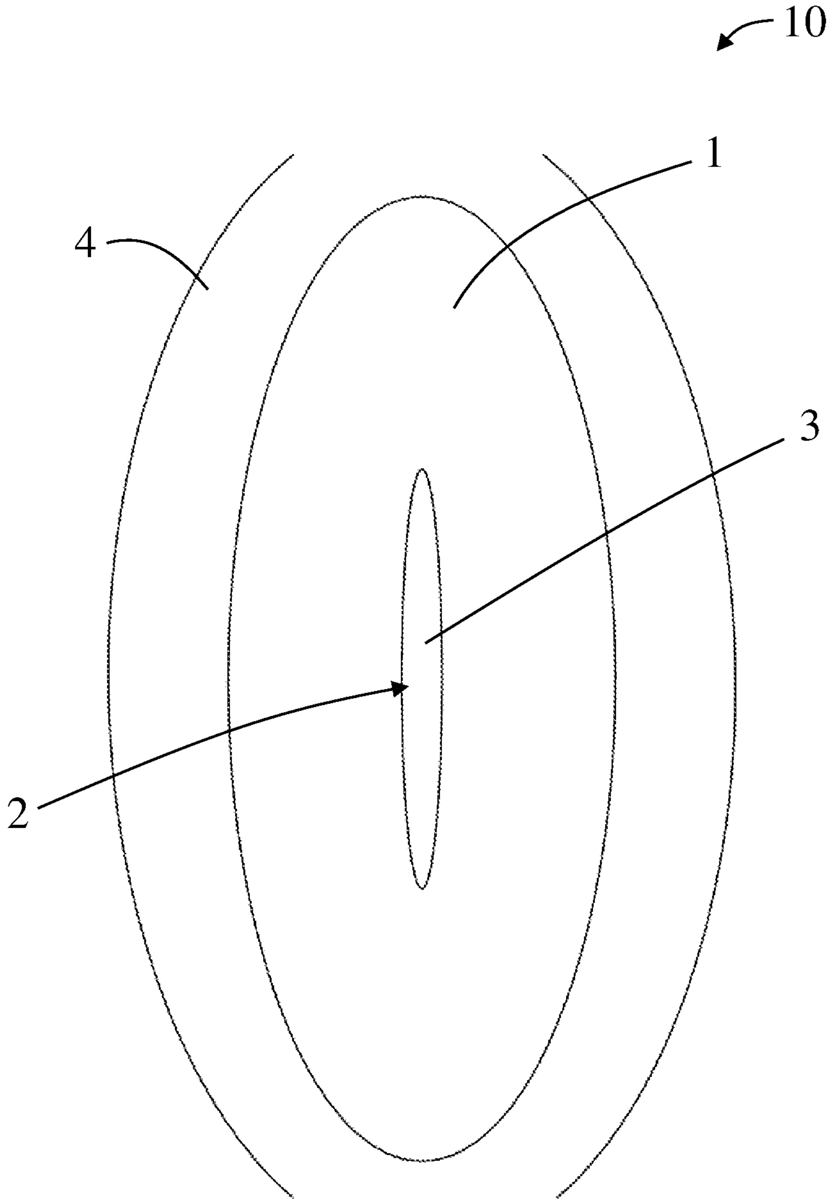
FIG. 2 is a diagrammatic illustration, illustrating the vibrator body during use, wherein it is arranged around the inner labia, without making direct use of the outer labia for holding the device in place.

FIG. 2 is diagrammatic illustration of the device of the present invention in use. FIG. 2 shows that the device 10 with the vibrato body 1 arranged within the labia majora 4 in such a way that the hole 2 of body 1 wholly or partly accommodates part of the labia minora 3.

Figure 3:
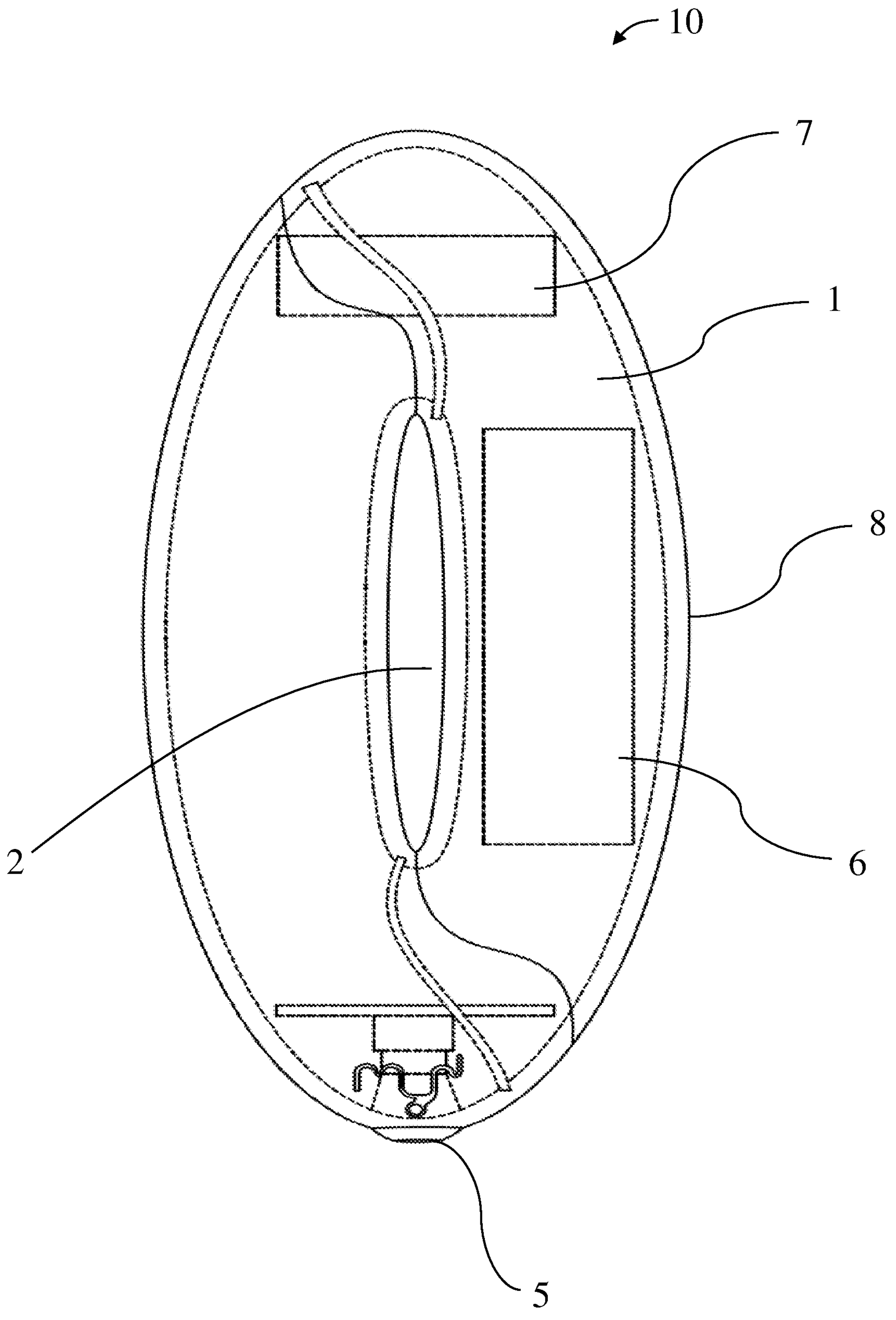
FIG. 3 is a partly see-through plan view, illustrating the internal design of the vibrator body, containing a vibration motor as well as a battery and the electronically setup and controller.

FIG. 3 is a partly see-through plan view of an embodiment of the device according to the present invention. FIG. 3 shows the vibrator body 1 with outer surface 8 and hole 2. At the surface 8 of the body 1 is arranged an electric socket 5 for providing electric power to the battery 7 which is housed within the body 1. A vibration motor 6 is likewise arranged within the body 1 of the device 10. A control system within the body 1 (not seen in FIG. 3) provides for controlling the device.

LIST OF REFERENCE NUMERALS

1 Vibrator body
2 Hole in vibrator body
3 Labia minora
4 Labia majora
5 Electric socket for charging battery
6 Motor
7 Battery
8 Outer surface of vibrator body
10 Vibrator

The invention claimed is:

1. A hands-free vibrator for stimulating a clitoris, comprising:

at least one vibration motor;

a vibrator body with an associated electronic setup, a power supply and a controller;

wherein the vibrator body comprises a hole and the vibrator body is designed as an oval, for positioning and holding of the vibrator;

wherein said hole is arranged in a middle of said oval vibrator body;

wherein said hole in said vibrator body has a largest extension in a longitudinal direction of 3.0-8.5 cm for attachment around a labia minora during use, thereby enabling hands-free operation, while avoiding any direct contact of the vibrator with the clitoris.

2. The hands-free vibrator according to claim 1, wherein the vibrator body in its interior independently houses one or more of the at least one vibration motor, the associated electronic setup, the power supply and/or the controller.

3. The hands-free vibrator according to claim 1, wherein the vibrator body independently has a largest outer dimension in the longitudinal direction of 4-9 cm; and/or wherein the vibrator body has a largest outer dimension in a first transversal direction being perpendicular to the longitudinal direction of 1.5-4 cm; and/or wherein the vibrator body has a largest outer dimension in a second transversal direction being perpendicular to both the longitudinal direction and the first transversal direction of 0.5-2.25 cm.

4. The hands-free vibrator according to claim 1, wherein the hole of the vibrator body is a though-going hole in said vibrator body.

5. The hands-free vibrator according to claim 1, wherein the hole of the vibrator body has an oblong shape.

6. The hands-free vibrator according to claim 5, wherein an orientation of the oblong shaped hole is aligned with the longitudinal direction of said vibrator body.

7. The hands-free vibrator according to claim 1, wherein the hole in the vibrator body has the largest extension in a-said longitudinal direction of 3.50-8.00 cm.

8. The hands-free vibrator according to claim 1, wherein the hole in the vibrator body has the largest extension in a direction perpendicular to the longitudinal direction of 0.1-3.50 cm.

9. The hands-free vibrator according to claim 1, wherein the at least one vibration motor is an electrically driven motor.

10. The hands-free vibrator according to claim 9, wherein the controller is electrically connected to the power supply and to the at least one vibration motor; and wherein said controller is configured for controlling an operation of said at least one vibration motor.

11. The hands-free vibrator according to claim 1, wherein the power supply is a battery.

12. The hands-free vibrator according to claim 11, wherein said body on an outer surface thereof comprises a first electric connection, wherein said first electric connection is electrically connected to said battery, thereby enabling charging of said battery.

13. The hands-free vibrator according to claim 1, wherein the controller is configured to switch on/off the at least one vibration motor; and optionally wherein the controller is configured to control a speed of the at least one vibration motor, and optionally, wherein the controller is configured to control a speed pattern as a function of time of said at least one vibration motor.

14. The hands-free vibrator according to claim 1, wherein the at least one vibration motor comprises an axle which is configured to rotate upon being supplied with power thereto, wherein said axle defines a rotational axis, wherein a weight element is attached to said axle in such a way that the center-of-mass of said weight element is arranged offset to said rotational axis of said axle, thereby providing vibrations upon rotating thereof.

15. The hands-free vibrator according to claim 1, wherein the vibrator comprises wings or grabbing arms that support a fixation around an inner labia.

16. The hands-free vibrator according to claim 1, wherein the vibrator comprises a receiver for electromagnetic radiation, wherein said receiver is electronically connected to said controller, thereby enabling remote and/or wireless control of said vibrator.

17. The hands-free vibrator according to claim 1, wherein the vibrator body is manufactured from a flexible material having a Shore 00 hardness of 0.1-85.

18. The hands-free vibrator according to claim 1, wherein the vibrator body is manufactured from a flexible material, optionally in the form of silicone or rubber.

19. The hands-free vibrator according to claim 1 comprising one or more control knobs being electrically connected to said controller, wherein one or more of said one or more control knobs is/are arranged at a position on an outer surface of said vibrator body.

* * * * *